Patented June 19, 1928.

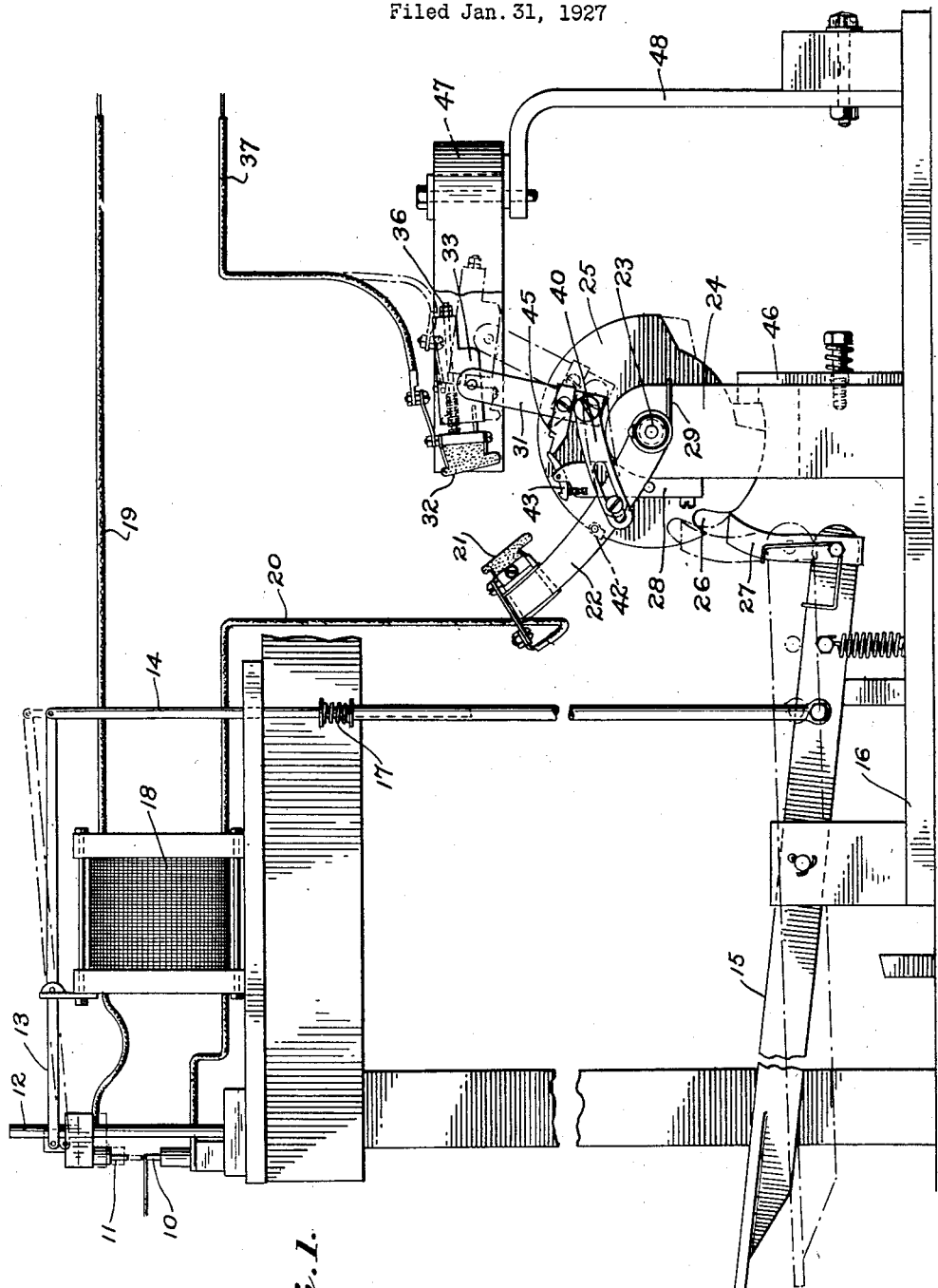

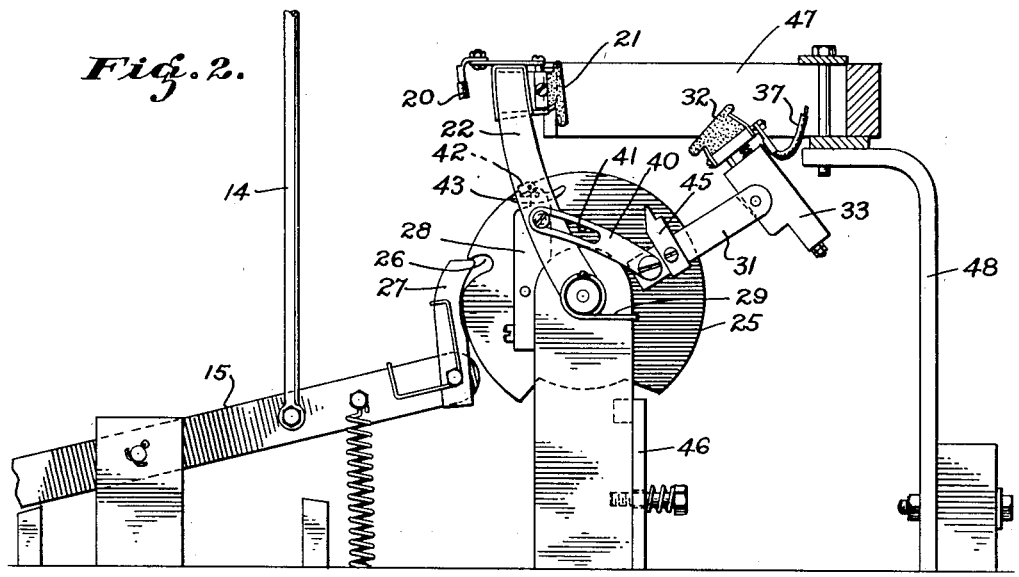
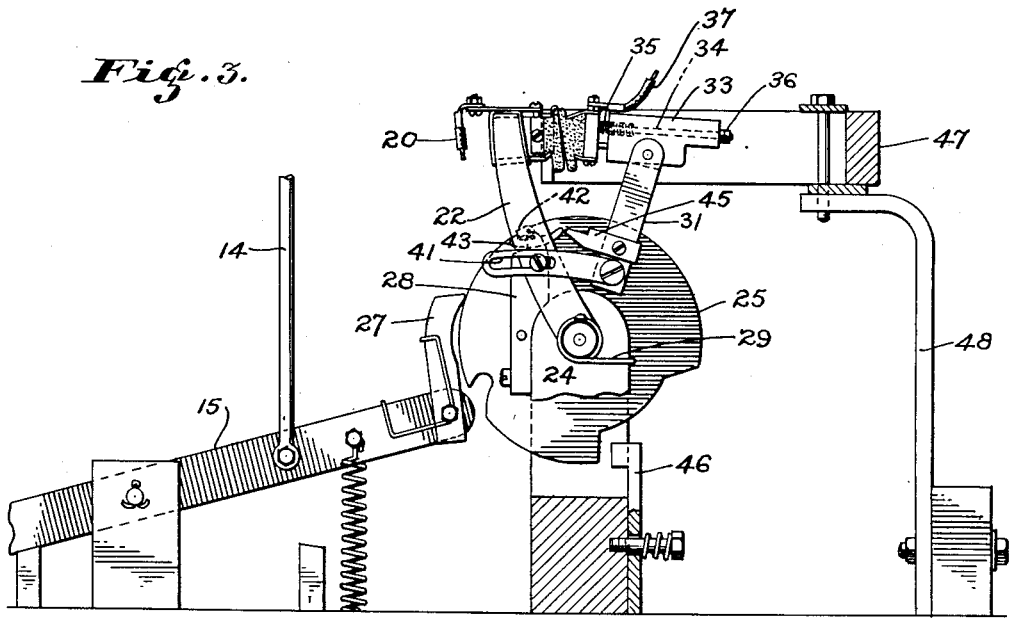

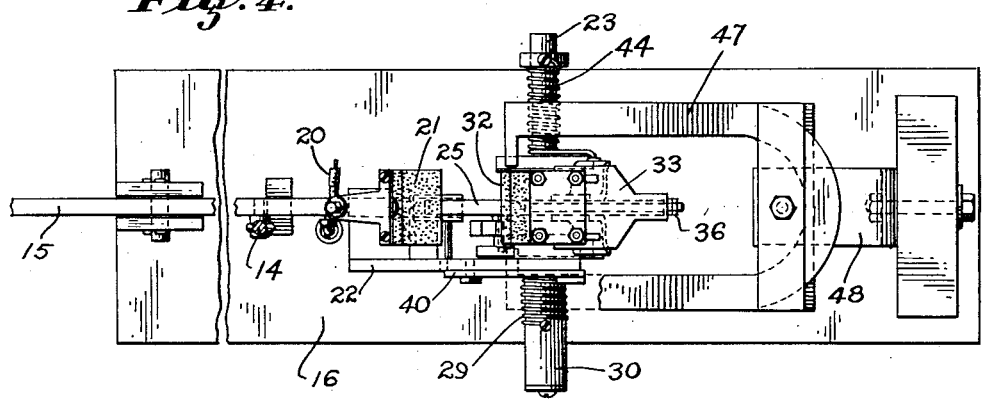
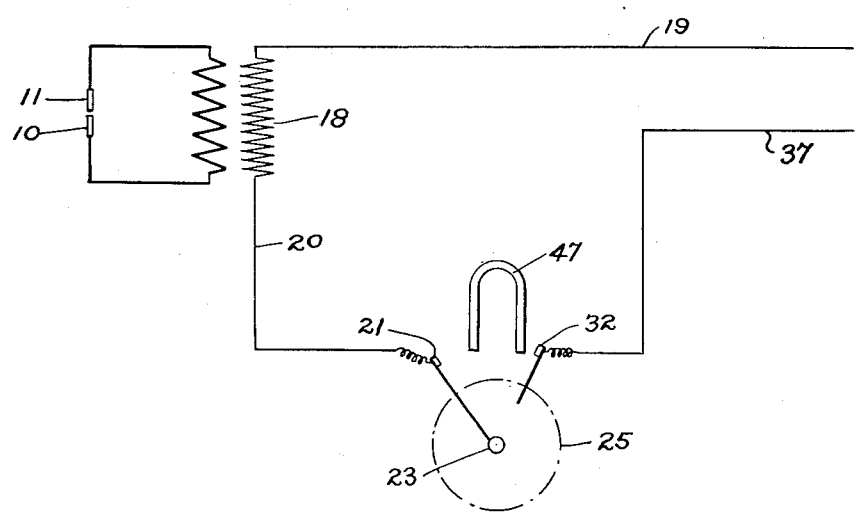

1,674,327

UNITED STATES PATENT OFFICE.

VALENTINE FORD GREAVES, OF OAKLAND, CALIFORNIA, ASSIGNOR TO THE MAG-NAVOX COMPANY, OF OAKLAND, CALIFORNIA, A CORPORATION OF ARIZONA.

ELECTRIC SPOT WELDER.

Application filed January 31, 1927. Serial No. 164,767.

This invention relates to a method of and apparatus for electric spot welding. Electric spot welding is a comparatively old art. The ordinary electric spot welder which can be purchased on the open market consists of a step-down transformer with a method of clamping the work between the terminals of the secondary circuit, and a separate electric switch for opening and closing the primary circuit. The pressure is applied to the work usually by a lever, and the duration of the current flow is usually optional with the operator. In large rough work this method is quite satisfactory, but in connection with the delicate and accurate spot welding required in the construction of a radio tube it was soon found that the types of spot welders available on the open market were not at all satisfactory, because they depended upon the accuracy of the operator in timing the current flow.

A thorough search of the open market was made, in an effort to locate a spot welder or switch, or a combination of both, which would give a uniform pressure on the work and a uniform timing of the current flow, independent of the ability or skill of the operator.

In this connection it is also desirable to use a maximum current for a minimum time period, with a view to concentrating the heat at the point of welding contact, thus reducing the spread of oxide contamination.

The object of this invention is to provide a method and apparatus whereby a spot welder of the transformer type can be adapted to provide accurate and uniform welding, without causing appreciable oxidation of the surfaces of the welded parts. Such oxidation is particularly objectionable in the manufacture of grids for vacuum tubes, and moreover, causes a certain amount of brittleness in the welded parts.

In and by the present invention, a method and means are provided whereby the following additional objects may be accomplished:

First, that uniform pressure shall be applied to the work, and the switch operated by one stroke of a single lever.

Second, that the pressure and timing operation of the switch shall be uniform, whether the lever be depressed rapidly or slowly by an unskilled operator.

Third, that the lever may be depressed almost to the tripping point and then returned to normal position without making contact through the switch.

Fourth, that the switch contacts be so designed as to maintain a fairly uniform contact resistance over long periods of time without the necessity of cleaning or adjustment. (It was found with all metallic contacts that the pitting and oxidation of the surfaces very quickly increased the resistance and decreased the current-carrying capacity to such an extent as to preclude the possibility of uniformity in quantity production work.)

Fifth, that the time of contact be adjustable for different classes of work.

Sixth, that the general design and construction be such as to stand up under the continuous "hammer blows", amounting to several thousand per day.

One form which my invention may assume is exemplified in the following description and illustrated in the accompanying drawings, in which Fig. 1 shows a side elevation of the complete apparatus;

Fig. 2 shows a side elevation partly in section of the switch and its operating mechanism, in the position assumed when the switch is about to be tripped;

Fig. 3 shows a similar view of the mechanism after the switch has been tripped and the contacts have come together;

Fig. 4 shows a plan view of the switch mechanism;

Fig. 5 shows a diagram of the electric wiring.

The work to be welded is placed between terminals 10 and 11. The lower terminal is preferably stationary, and the upper one is carried slidably on a post 12, being moved up and down by a lever 13 which connects with a link 14, the latter in turn being connected with a foot lever 15, which is pivotally mounted on the base 16 of the machine. The link 14 is made in two telescopic sections, between which is interposed a spring 17, whereby substantially uniform pressure is applied to the work.

The terminals 10 and 11 are electrically connected to the secondary winding of a transformer 18. The primary winding of this transformer is connected at one side to a feed wire 19, and at the other side to a conductor 20, which leads to a switch contact 21.

This contact 21 is in the form of a carbon block suitably mounted upon an arm 22, said arm being pivotally mounted upon a shaft 23, which shaft is journaled in supports 24 extending up from the base 16. Fixed on this shaft is a disc 25, which is provided with a tooth 26 to co-operate with a pawl 27, spring-pressed and pivotally mounted on the end of the foot lever 15. The arm 22 is normally held retracted against an abutment on a post 28 by means of a torsion spring 29 mounted upon a sleeve or boss 30 fixed to said arm, the spring having one end anchored to the sleeve and the other end fastened to the adjacent support 24. Fixed rigidly upon the disc is an arm 31, which carries the other contact member 32 of the switch mechanism. This contact member 32 is likewise in the form of a carbon block, and is slidably connected to an insulating support 33 by means of a rod 34, upon which is a spring 35 acting to press the said contact member 32 away from the insulating support, the pressure of the spring being restrained by a nut 36 on the end of the rod. The support 33 is pivotally mounted on the end of the arm 31 for rocking movement in a vertical plane.

The contact member 32 is electrically connected to a lead-in conductor 37. Both contact members 21 and 32 have relatively large and flat contacting surfaces, and are mounted in metal clips suitably insulated from the arms 22 and 31.

In the operation of the switch and welding mechanism, the foot lever 15 is depressed to bring the two terminals into contact with the parts to be welded, and simultaneously therewith the pawl 27 engages the tooth 26 in the disc, and rotates the latter from the position shown in Fig. 1 to the position shown in Fig. 2. The disc carries the contact supporting arm 31 with it, and by virtue of a link 40 which extends from the arm 31 to the arm 22, the latter is also carried along with the disc after a slight initial movement. This link has a slotted connection 41 with the arm 22. When the disc has reached its extreme limit of movement, the detent 42 on the arm 22 rides over the nose of a pawl 43 and becomes latched thereby. This pawl 43 is pivotally mounted on the upper end of the stationary post 28. The arm 22 in thus moving upwardly has put the spring 29 under tension. Likewise, the disc 25 has tensioned a spring 44 on the end of the shaft 23.

Owing to the shape of the pawl 27 and the tooth 26, the pawl will ride out of engagement with the tooth when it reaches the point shown in Fig. 2, and allow the disc to fly back under the force of the spring 22, carrying with it the rigid arm 31 and its contact member. This contact member 32 shoots forwardly with great speed and slaps the other contact member 21, which is being held stationary by the latch device. The normal angle of the two contact blocks is such that they first contact at their upper edges, as indicated in Fig. 3, and thereafter they adjust themselves to a full-face contact by virtue of the pivotal mounting of the insulating block 33.

Immediately when the contact members are in full engagement, a projection 45 on the arm 31 strikes the tail of the pawl 43 and causes it to release the detent on the arm 22. Thereupon the arm 22 flies back under the force of its spring 29, and the impetus imparted to it by the blow of the contact member 32. At the same instant the travel of the arm 31 has been stopped by the impact of its contact member, and the fact that the disc has practically reached the limit of its return movement, being then in engagement with a spring-pressed buffer 46.

The time of contact between the two members 21 and 32 is exceedingly brief, and in separating they again assume their normal angle, by virtue of the spring 35 and the pivotal mounting of the block 33. This insures that separation of the contact members will occur at their upper edges, thus confining the arcing to the edges, and protecting the faces of the carbon blocks. A magnet 47, either permanent, or electrically wound, is mounted upon a bracket 48 in position where its terminals will create a magnetic field across the space where the two contact members 21 and 32 separate. This will assist in wiping out the arc.

The foregoing operation completes itself, even though the operator continues to hold the foot lever depressed. Subsequent release of the foot lever restores the parts for subsequent operation.

A stroboscopic observation of this mechanism on a 60-cycle alternating current shows that it may be adjusted to operate exactly on one-half cycle, and thus provide a maximum current for a minimum time. It is due to the fact that a heavy current may be applied to the work for an infinitesimal period of time, that a perfect welding can be made without causing oxidation or brittleness. The mechanism is such that nothing is left to the skill of the operator; at least in determining the degree of pressure upon the work, and the length of time that the current is applied thereto.

Unlike prior attempts at electrical welding to avoid oxidation of the parts, this invention does not depend upon percussive engagement of the terminals with the parts to be welded. On the contrary, the terminals are brought into engagement with the work and a certain definite pressure is applied thereon by the spring 17, before any electrical discharge takes place. It is immaterial how long the foot lever be kept depressed and the pressure applied on the terminals. The duration of the current is entirely independent of these factors, and is wholly controlled by the automatic action of the switch mechanism. An adjustment is permitted by the nut 36, or by re-setting the projection 45 so that the period of contact between the switch members may be increased or decreased, to suit the particular work in hand.

Various changes in the construction and arrangement of the several parts herein shown and described may be employed without departing from the spirit of my invention as disclosed in the appended claims.

Having thus described my invention, what I claim as new and desire to secure by Letters Patent is:

1. An automatic switch for momentarily closing an electric circuit, comprising a pair of movable switch points, means serving normally to retain said switch points in separated position, means for imparting rapid movement to one of said switch points towards the other while holding the latter stationary, means for releasing the latter switch point and permitting it to travel rapidly away from the first-mentioned switch point after the two have come into contact with each other, and means to restrain further movement of the first-mentioned switch point after it contacts with the other one.

2. An automatic switch for momentarily closing an electric circuit, comprising a pair of movable switch points, means serving normally to retain said switch points in separated position, means for imparting rapid movement to one of said switch points towards the other while holding the latter stationary, means for releasing the latter switch point and permitting it to travel rapidly away from the first-mentioned switch point after the two have come into contact with each other, said switch points being in the form of blocks having flat contacting faces, and a mounting for said blocks whereby they are caused to separate with their edges only in contact, so as to limit the area of arcing.

3. An automatic switch for momentarily closing an electric circuit, comprising a pair of movable switch points, means serving normally to retain said switch points in separated position, means for imparting rapid movement to one of said switch points towards the other while holding the latter stationary, means for releasing the latter switch point and permitting it to travel rapidly away from the first-mentioned switch point after the two have come into contact with each other, and a magnet having its poles exposed so as to create a magnetic field across the space where said switch points separate, to assist in wiping out the arc.

4. An automatic switch for momentarily closing an electric circuit, comprising a pair of movable contact members, means serving normally to retain said contact members in separated position, means for imparting rapid movement to one of said contact members towards the other while holding the latter stationary, and means for releasing the latter contact member and permitting it to travel rapidly away from the first-mentioned one after the two have come into contact with each other.

5. An automatic switch for momentarily closing an electric circuit, comprising a pair of movable contact members, means to place said members under spring tension in separated position, means to release one of said members while restraining the other, whereby the former will strike the latter with a swift blow, and means to release the latter member immediately upon the blow being struck, whereby it will travel rapidly away from the former under the impetus of the blow and the action of the spring.

VALENTINE FORD GREAVES.